United States Patent
Lee et al.

(10) Patent No.: US 9,529,143 B2
(45) Date of Patent: Dec. 27, 2016

(54) BACKLIGHT ASSEMBLY HAVING SUPPORT FRAME

(71) Applicant: Samsung Display Co., Ltd., Yongin, Gyeonggi-Do (KR)

(72) Inventors: Lu Ly Lee, Yongin-si (KR); Yong Hwi Kim, Asan-si (KR); Dong Hyeon Lee, Seoul (KR); Seung Hwa Ha, Namyangju-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/473,734

(22) Filed: Aug. 29, 2014

(65) Prior Publication Data
US 2015/0268412 A1 Sep. 24, 2015

(30) Foreign Application Priority Data
Mar. 24, 2014 (KR) .......... 10-2014-0034253

(51) Int. Cl.
*F21V 7/04* (2006.01)
*F21V 8/00* (2006.01)

(52) U.S. Cl.
CPC ........... *G02B 6/0091* (2013.01); *G02B 6/0083* (2013.01)

(58) Field of Classification Search
CPC ... G02B 6/0031; G02B 6/0081; G02B 6/0083; G02B 6/0071; G02B 6/009; G02B 6/0091
USPC ............. 362/609, 611, 633; 349/58
See application file for complete search history.

(56) References Cited

U.S. PATENT DOCUMENTS

| | | | |
|---|---|---|---|
| 7,922,380 B2* | 4/2011 | Park ................................. 362/631 |
| 8,531,624 B2 | 9/2013 | Que et al. |
| 2010/0123851 A1* | 5/2010 | Mo et al. .......................... 349/58 |
| 2011/0170034 A1* | 7/2011 | Jeong ............................... 349/61 |
| 2012/0169958 A1* | 7/2012 | Lee et al. ......................... 349/58 |
| 2012/0281165 A1* | 11/2012 | Choi et al. ....................... 349/62 |
| 2013/0027967 A1 | 1/2013 | Urano et al. |
| 2014/0092356 A1* | 4/2014 | Ahn et al. ...................... 349/153 |
| 2014/0111735 A1* | 4/2014 | Cho et al. ........................ 349/58 |
| 2015/0219940 A1* | 8/2015 | Kim et al. ....................... 349/58 |
| 2015/0219964 A1* | 8/2015 | Park et al. ....................... 349/58 |

FOREIGN PATENT DOCUMENTS

| KR | 20-0421091 | 7/2006 |
| KR | 1020070031107 A | 3/2007 |

(Continued)

*Primary Examiner* — Donald Raleigh
(74) *Attorney, Agent, or Firm* — Innovation Counsel LLP

(57) ABSTRACT

A backlight assembly comprises: a receptacle; a support frame; and a light source module. The support frame is arranged on one side of the receptacle. The light source module is accommodated in the support frame and includes a printed circuit board and light sources. The support frame includes: a bottom portion; a side wall portion; a cover portion; a gap holding portion; and an insertion groove. The side wall portion extends from the bottom portion. The cover portion extends from the side wall portion to an inside. The gap holding portion extends from an end portion of the cover portion in a direction of the bottom portion. The printed circuit board is partially inserted into the insertion groove to be arranged on the upper surface of the bottom portion. The light sources are surrounded by the side wall portion, the cover portion, and the gap holding portion.

20 Claims, 14 Drawing Sheets

(56) References Cited

FOREIGN PATENT DOCUMENTS

| KR | 1020110027329 A | 3/2011 |
|----|-----------------|--------|
| KR | 1020110057521 A | 6/2011 |
| KR | 1020110094597 A | 8/2011 |
| KR | 1020110113981 A | 10/2011 |
| KR | 101086685 B1 | 11/2011 |
| KR | 1020110134029 A | 12/2011 |
| KR | 1020120026319 A | 3/2012 |
| KR | 1020120049069 A | 5/2012 |
| KR | 1020130003826 A | 1/2013 |
| KR | 1020130067591 A | 6/2013 |

* cited by examiner

BACKLIGHT ASSEMBLY HAVING SUPPORT FRAME

CROSS-REFERENCE TO RELATED APPLICATIONS

This application is based on and claims priority from Korean Patent Application No. 10-2014-0034253, filed on Mar. 24, 2014 in the Korean Intellectual Property Office, the disclosure of which is incorporated herein in its entirety by reference.

BACKGROUND

1. Field

The present application relates to a backlight assembly.

2. Description of the Prior Art

A liquid crystal display (LCD) is a display device, in which liquid crystals are injected between two glass substrates, and the molecular orientation of the liquid crystals for each pixel is changed through application of a power to upper and lower glass substrate electrodes to display an image. Unlike a cathode ray tube (CRT) or a plasma display panel (PDP), the liquid crystal display is not self-luminous, and thus is unable to be used in a place where there is no light. In order to supplement such drawbacks, a backlight assembly for uniformly emitting light onto a display panel is mounted to enable the liquid crystal display to be used even in a dark place.

The backlight unit is classified into a direct-illumination type and an edge-illumination type according to positions of light sources. The edge-illumination type backlight unit requires a light guide panel which guides light emitted from light sources mounted on a printed circuit board and provides the guided light to the display panel.

SUMMARY

The light guide panel may be expanded in the direction of light sources due to heat generated during driving of the light sources. The expanded light guide panel may damage the light sources or may separate the light sources from the printed circuit board. Further, the heat generated from the light sources may deteriorate the light sources themselves.

Accordingly, one embodiment provides a backlight assembly, which can prevent light sources from being damaged or being separated from a printed circuit board, and can improve the heat dissipation performance of the light sources.

Additional features will be set forth in part in the description which follows and in part will become apparent to those having ordinary skill in the art upon examination of the following or may be learned from practice of the inventive concept.

In one embodiment, there is provided a backlight assembly comprising: a receptacle; a support frame; and a light source module. The support frame is arranged on one side of the receptacle. The light source module is accommodated in the support frame and includes a printed circuit board and a plurality of light sources projecting from one surface of the printed circuit board. The support frame includes: a bottom portion; a side wall portion; a cover portion; a gap holding portion; and an insertion groove. The side wall portion extends from the bottom portion to an upper side. The cover portion extends from the side wall portion to an inside. The gap holding portion extends from an end portion of the cover portion in a direction of the bottom portion. The insertion groove is outwardly indented from an inner side wall of the side wall portion to an outside on a boundary between the bottom portion and the side wall portion and has a bottom surface extending from an upper surface of the bottom portion. The printed circuit board is partially inserted into the insertion groove to be arranged on the upper surface of the bottom portion. The plurality of light sources are arranged in a space that is surrounded by the side wall portion, the cover portion, and the gap holding portion.

The plurality of light sources may have directivity in a side direction.

The backlight assembly may further comprise a light guide panel arranged on the receptacle and having a side surface facing the plurality of light sources in a state where the gap holding portion is interposed between the side surface and the plurality of light sources.

One side of the light guide panel may overlap the bottom portion and the printed circuit board.

Each of the plurality of light sources may comprise a light source element and a support portion in which the light source element is buried, and a part of the support portion may overlap the gap holding portion.

The support frame may be integrally formed.

The side wall portion may comprise a first side wall portion connected to the bottom portion and a second side wall portion separated from the first side wall portion and connected to the cover portion, and the first side wall portion and the second side wall portion are combined with each other by a fastening member.

The receptacle may comprise a bottom and a side wall, the bottom portion includes a base portion that is closed to the side wall and has a first thickness, and an is extension portion that extends from the base portion to an inside of the receptacle and has a second thickness that is thicker than the first thickness, and the printed circuit board is arranged on an upper surface of the base portion.

The support frame may be formed of a metal material.

The receptacle, the support frame, and the printed circuit board may have a curvature so as to be applied to a curved display.

According to another embodiment, there is provided a backlight assembly comprising: a receptacle; a support frame; and a light source module. The support frame is arranged on one side of the receptacle. The light source module is accommodated in the support frame and includes a printed circuit board and a plurality of light sources projecting from one surface of the printed circuit board. The support frame includes: a bottom portion; a side wall portion; a cover portion; and an insertion groove. The side wall portion extends from the bottom portion to an upper side. The cover portion extends from the side wall portion to an inside. The insertion groove is outwardly indented from an inner side wall of the side wall portion to an outside on a boundary between the bottom portion and the side wall portion and has a bottom surface extending from an upper surface of the bottom portion. The printed circuit board is partially inserted into the insertion groove to be arranged on the upper surface of the bottom portion. The plurality of light sources are arranged in a space that is surrounded by the side wall portion and the cover portion.

The plurality of light sources may have directivity in a side direction.

The backlight assembly may further comprise a light guide panel arranged on the receptacle and having a side surface facing the plurality of light sources in a state where the side surface is spaced apart from the plurality of light sources and to form a gap between the plurality of light sources.

The cover portion may extend from an upper portion of the side wall portion to come in contact with the side surface of the light guide panel.

One side of the light guide panel may overlap the bottom portion and the printed circuit board.

Each of the plurality of light sources may comprise a light source element and a support portion in which the light source element is buried, and an upper surface of the support portion may be positioned to be lower than an upper surface of the light guide panel.

The side wall portion and the cover portion may be separated from each other, and are combined with each other by a fastening member.

The receptacle may comprise a bottom and a side wall, the bottom portion includes a base portion that is closed to the side wall and has a first thickness, and an extension portion that extends from the base portion to an inside of the receptacle and has a second thickness that is thicker than the first thickness, and the printed circuit board may be arranged on an upper surface of the base portion.

The support frame may be formed of a metal material.

The receptacle, the support frame, and the printed circuit board may have a curvature so as to be applied to a curved display.

According to various embodiments, at least the following features are presented.

That is, the backlight assembly can hold the gap between the light sources and the light guide panel through the gap holding portion of the support frame that accommodates and supports the light source module, and thus can minimize expansion of the light guide panel due to heat generated from the light sources. Accordingly, the backlight assembly can prevent the light sources from being damaged by the expanded light guide panel or being separated from the printed circuit board.

Further, the backlight assembly can make the light sources come in contact with the side wall portion of the support frame through forming of the insertion groove on the side wall portion so that the projection portion can be inserted into the side wall portion of the support frame around the light sources on the printed circuit board. Accordingly, the backlight assembly can make heat generated from the light sources be discharged to the support frame without leakage, and thus can improve the heat dissipation performance of the light sources to reduce the deterioration of the light sources.

Embodiments are not limited to the contents as exemplified above, but further various embodiments are included in the description.

BRIEF DESCRIPTION OF THE DRAWINGS

The above and other features will be more apparent from the following detailed description taken in conjunction with the accompanying drawings, in which.

DETAILED DESCRIPTION OF THE EMBODIMENTS

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

It will also be understood that when a layer is referred to as being "on" another layer or substrate, it can be directly on the other layer or substrate, or intervening layers may also be present. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the inventive concept.

Hereinafter, embodiments will be described with reference to the accompanying drawings.

Figure 1:
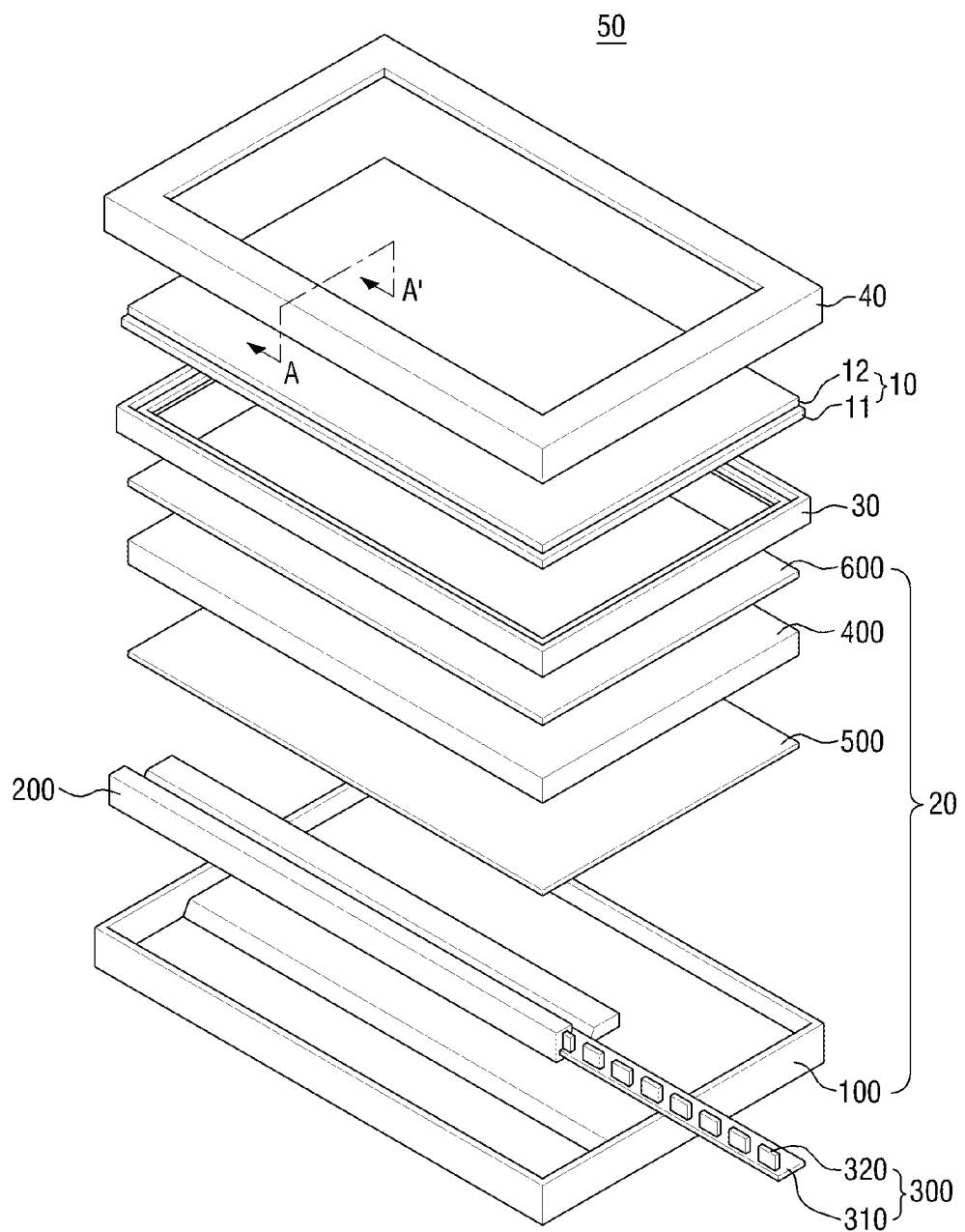
FIG. 1 is an exploded perspective view of a display device according to an embodiment.
Figure 2:
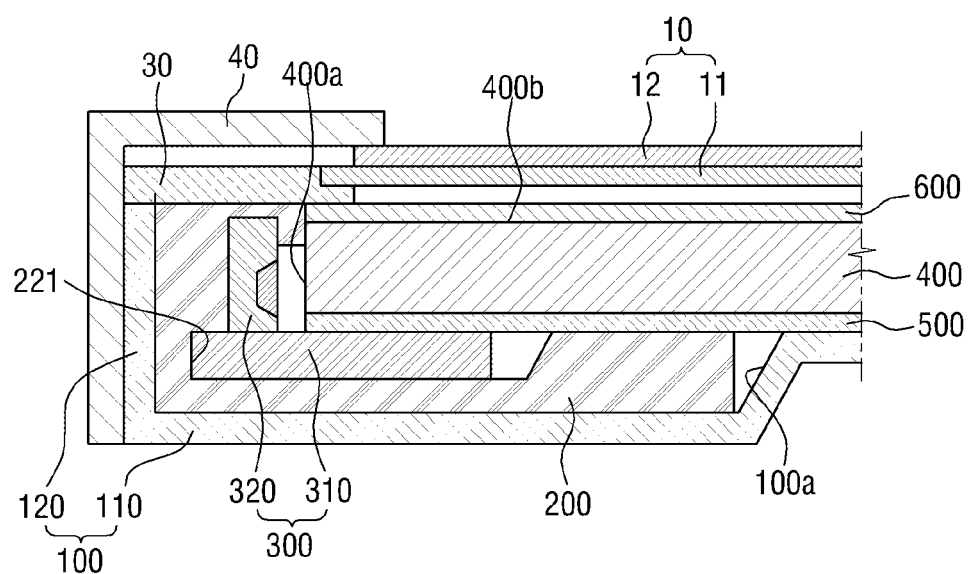
FIG. 2 is a cross-sectional view taken along line A-A' of FIG. 1.
Figure 3:
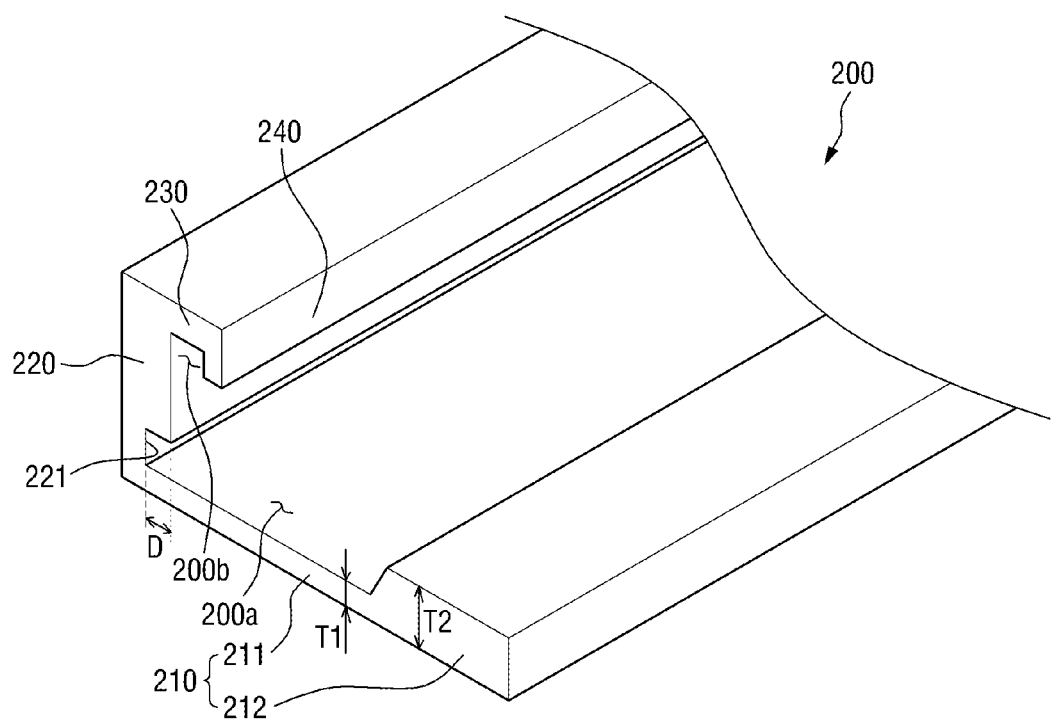
FIG. 3 is a perspective view illustrating the detailed structure of a support frame of FIG. 2.
Figure 4:
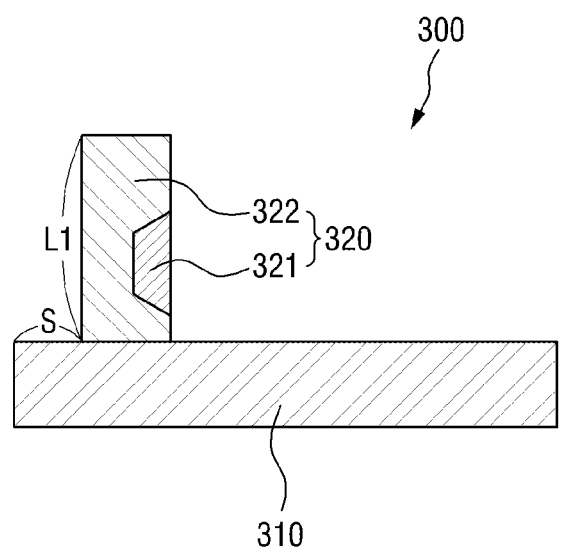
FIG. 4 is a cross-sectional view illustrating the detailed structure of a light source module of FIG. 2.
Figure 5:
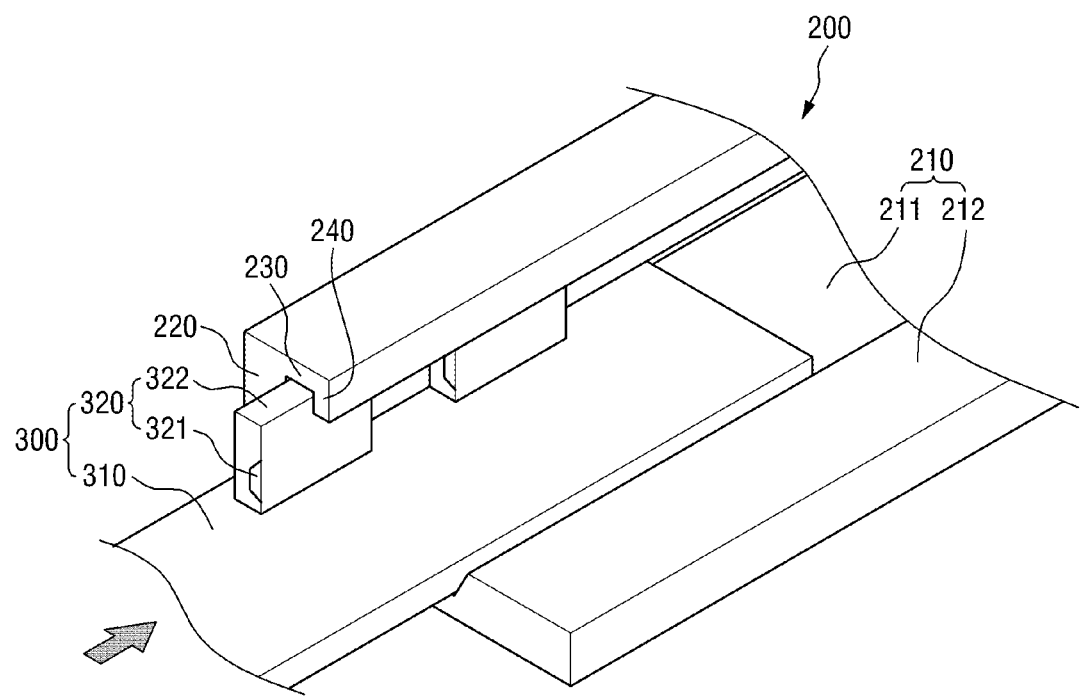
FIG. 5 is a perspective view explaining a method for assembling a light source module and a support frame of FIG. 2.
Figure 6:
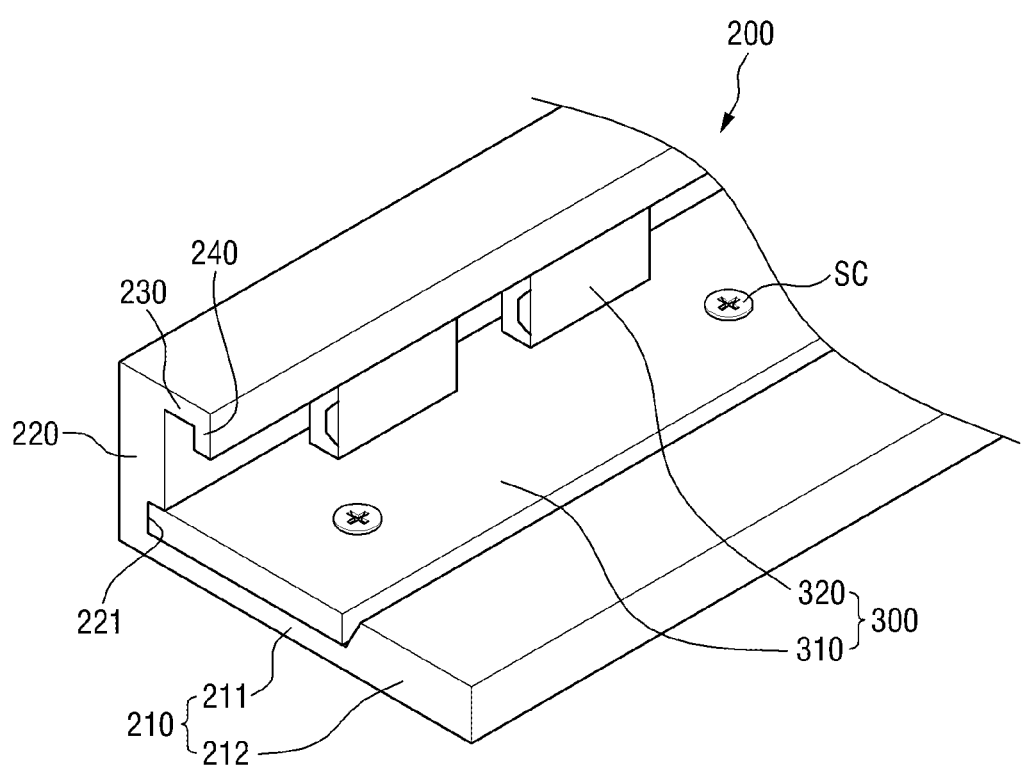
FIG. 6 is a perspective view illustrating a combined structure of a light source module and a support frame obtained through the assembling method of FIG. 5.

FIG. 1 is an exploded perspective view of a display device according to an embodiment, and FIG. 2 is a cross-sectional view taken along line A-A' of FIG. 1. FIG. 3 is a perspective view illustrating the detailed structure of a support frame of FIG. 2, and FIG. 4 is a cross-sectional view illustrating the detailed structure of a light source module of FIG. 2. FIG. 5 is a perspective view explaining a method for assembling a light source module and a support frame of FIG. 2, and FIG. 6 is a perspective view illustrating a is combined structure of a light source module and a support frame obtained through the assembling method of FIG. 5.

Referring to FIGS. 1 and 2, a display device 50 includes a display panel 10 and a backlight assembly 20 arranged on a lower portion of the display panel 10.

The display panel 10 may include an upper display panel 12 and a lower display panel 11 which face each other. The upper display panel 12 and the lower display panel 11 may be combined with each other by a sealing material (not illustrated). A liquid crystal layer (not illustrated) may be interposed between the upper display panel 12 and the lower display panel 11. Polarizing sheets (not illustrated) may be attached to outsides of the upper display plate 12 and the lower display plate 11.

On the lower display panel 11, a plurality of pixel electrodes, wirings for driving the pixel electrodes, and switching elements may be formed. Further, a common electrode may be provided on the upper display panel 12 or the lower display panel 11 to apply an electric field to the liquid crystal layer. Color filters and black matrices may be formed on the upper display panel 12 or the lower display panel 11.

The backlight assembly 20 may include a lower receptacle 100, a support frame 200, a light source module 300, a light guide panel 400, a reflection sheet 500, and an optical sheet 600.

The lower receptacle 100 includes a bottom 110 and a side wall 120, and accommodates therein the support frame 200, the light source module 300, the light guide panel 400, the reflection sheet 500, and the optical sheet 600. The lower receptacle 100 may be a bottom chassis. The lower receptacle 100 may include a recess portion 100a formed on one side of the bottom 110 to accommodate the support frame 200 arranged therein.

The support frame 200 is arranged along one side, for example, a long side, of the lower receptacle 100, and includes a first accommodation space 200a and a second accommodation space 200b to accommodate the light source module 300. The support frame 200 may be integrally formed of a metal material, and as illustrated in FIG. 3, may include a bottom portion 210, a side wall portion 220, a cover portion 230, and a gap holding portion 240.

The bottom portion 210 is arranged on the bottom 110 of the lower receptacle 100. The bottom portion 210 may include a base portion 211 that is close to the side wall 120 of the lower receptacle 100 and has a first thickness T1, and an extension portion 212 that extends from the base portion 211 to the inside of the lower receptacle 100 and has a second thickness T2 that is thicker than the first thickness T1. The bottom portion 210 may dissipate heat that is generated from a printed circuit board 310 of the light source module 300.

The side wall portion 220 is formed to extend from the bottom portion 210, specifically, one side of the base portion 211, to the upper side. On the other hand, the first accommodation space 200a, which is a space surrounded by the side wall portion 220 and the bottom portion 210, may be formed. On the boundary between the bottom portion 210 and the side wall portion 220, an insertion groove 221 is formed to be outwardly indented from an inner side wall of the side wall portion 220 to the outside. A bottom surface of the insertion groove 221 extends from an upper surface of the bottom portion 210. One portion of the printed circuit board 310 of the light source module 300 to be described below is inserted into the insertion groove 221.

The cover portion 230 is formed to extend from the side wall portion 220 to the inside. Specifically, the cover portion 230 extends from an upper portion of the side wall portion 220 to a gap portion between a plurality of light sources and the light guide panel 400 in the lower receptacle 100, and is parallel to the bottom portion 210. The cover portion 230 may cover the light sources 320 of the light source module 300 to be described below.

The gap holding portion 240 is bent and extends from an end portion of the cover portion 230 to the direction of the bottom portion 210. The gap holding portion 240 is parallel to the side wall portion 220, and is spaced apart from the bottom portion 210. The gap holding portion 240 serves to hold the gap between the plurality of light sources 320 and the light guide panel 400. Thus, the gap holding portion 240 minimizes expansion of the light guide panel 400 by the heat generated from the light sources 320. This prevents the light sources 320 from being damaged by the light guide panel 400 being expanded or being separated from the printed circuit board 310. On the other hand, the second accommodation space 200b, which is a space surrounded by the side wall portion 220, the cover portion 230, and the gap holding portion 240, may be formed in an upper portion of the first accommodation space 200a.

The light source module 300 is accommodated in the support frame 200 and provides light to the display panel 10. The light source module 300 includes the printed circuit board 310, and the plurality of light sources 320 mounted on the printed circuit board 310.

The printed circuit board 310 is accommodated in the first accommodation space 200a of the support frame 200 and is arranged on an upper surface of the bottom portion 210, specifically, on an upper surface of the base portion 211. In this case, a part of the printed circuit board 310 is inserted into the insertion groove 221 formed on the side wall portion 220 to be firmly fixed to the support frame 200.

The printed circuit board 310 provides a space in which the plurality of light sources 320 are mounted, and includes a wiring layer (not illustrated) for a path to provide a power for driving the plurality of light sources 320 to the plurality of light sources 320. The printed circuit board 310 may be in a bar type that extends along one side of the lower receptacle 100.

The plurality of light sources 320 are arranged on the printed circuit board 310 to be spaced apart from each other along the one side of the lower receptacle 100, and are accommodated in the second accommodation space 200b of the support frame 200.

Each of the respective light sources 320 may have directivity in the side direction, and may include a light source element 321, such as a light emitting diode (LED) and a support portion 322 supporting the light source element 321. The light source element 321 may be buried in the support portion 322, and in this case, light may be emitted from one surface of the support portion 322 to be incident to the light guide panel 400. The support portion 322 may have a first length L1 from the upper surface of the printed circuit board 310 to overlap the gap holding portion 240 so that the light source 320 is accommodated in the second accommodation space 200b and is supported by the gap holding portion 240. In this case, an upper surface of the support portion 322 may be positioned at a higher position than an upper surface of the light guide panel 400.

On the other hand, each of the light sources 320 is not mounted to coincide with an outer circumference of the printed circuit board 310, but is mounted to be spaced apart from the outer circumference for a predetermined distance S. Accordingly, the printed circuit board 310 projects by the predetermined distance S in the direction of the side wall portion 220 of the support frame 200 around the light source 320 on a plane. In order to dissipate the heat generated from the light source element 321, it is necessary for the light source 320 to come in contact with the side wall portion 220 of the support frame 200 that is formed of a metal material. For this, the insertion groove 221 formed on the side wall portion 220 may have a depth D that is equal to or longer than the predetermined distance S so that the projection portion of the printed circuit board 310 is inserted into the side wall portion 220 of the support frame 200 around the light source 320.

Hereinafter, an exemplary method for assembling the support frame 200 and the light source module 300 will be described.

As illustrated in FIG. 5, the light source module 300 is inserted into the support frame 200 in a sliding manner. That is, the printed circuit board 310 is inserted into the first accommodation space 200a, and the plurality of light sources 320 are inserted into the second accommodation space 200b. In this case, the printed circuit board 310 may be guided by the insertion groove 221 (in FIG. 6) to be inserted into the first accommodation space 200a, and the plurality of light sources 320 may be guided by the gap holding portion 240 to be inserted into the second accommodation space 200b. On the other hand, some of the plurality of light sources 320, which are mounted to be tilted at a specific angle in the process of mounting the light sources 320 on the printed circuit board 310, may be corrected by the gap holding portion 240 in the insertion process as described above.

Then, as illustrated in FIG. 6, after the light source module 300 is inserted into the support frame 200, the light source module 300 is fixed to the support frame 200 using a fastening means SC, for example, a screw. For example, the fastening means SC is fastened to the printed circuit board 310 and the base portion 211.

Referring again to FIGS. 1 and 2, the light guide panel 400 is arranged on the bottom 110 of the lower receptacle 100, and specifically, is arranged so that a side surface of the light guide panel 400 faces the plurality of light sources 320 in a state where the gap holding portion 240 of the support frame 200 is interposed between them. The light guide panel 400 includes a light incident surface (or side surface) 400a, to which the light that is generated from the light source 320 is incident, and a light emission surface (or upper surface) 400b, from which the light is emitted in the direction of the display panel 10. That is, the light guide panel 400 guides the light supplied from the plurality of light sources 320 to the side of the display panel 10.

The light guide panel 400 may be in a rectangular plate shape, and may be made of a transparent material that refracts the light. In an exemplary embodiment, the transparent material may be transparent polymer resin, such as polycarbonate or polymethylmethacrylate, but is not limited thereto. The transparent material may be a flexible material. The light guide panel 400 may have a cuboidal plate shape. In the description, it is described that the light guide panel 400 is in the cuboidal plate shape, but is not limited thereto. The light guide panel 400 may be in various shapes.

One side, on which the light incident surface 400a of the light guide panel 400 is positioned, may overlap the printed circuit board 310 and the bottom portion 210 of the support frame 200. That is, the one side portion, on which the light incident surface 400a of the light guide panel 400 is positioned, may be arranged on the printed circuit board 310.

The reflection sheet 500 may be arranged between the lower portion of the light guide panel 400 and the bottom 110 of the lower receptacle 100, between the lower portion of the light guide panel 400 and the printed circuit board 310, and between the lower portion of the light guide panel 400 and the extension portion 212 of the support frame 200. The reflection sheet 500 reflects leakage light, which is generated from the plurality of light sources 320, but is not applied to the light guide panel 400, to the side of the display panel 10.

The optical sheet 600 is a structure that is arranged on the upper portion of the light guide panel 400 to modulate the light that is supplied through the light guide panel 400. The optical sheet 600 may include a prism sheet, a diffusion sheet, a micro lens sheet, a lenticular sheet, a phase difference compensation sheet, and a reflective polarizing sheet.

The display panel 10 may be accommodated in a middle receptacle 30. The middle receptacle 30 may be a mold frame or a middle mold. The middle receptacle 30 may be fixedly fastened to the lower receptacle 100. The optical sheet 600 may be accommodated in the lower receptacle 100 or the middle receptacle 30. In the drawing, it is exemplified that the middle receptacle 30 is in a rectangular frame shape. However, two bar-type middle receptacles may be provided to be arranged on the long side or the short side of the display device 50.

An upper receptacle 40 may be arranged on the upper portion of the display panel 10. The upper receptacle 40 may be a top chassis or a bezel. The upper receptacle 40 includes an open window, and covers the border of the display panel 10 to protect the border of the display panel 10. The upper receptacle 40 may be combined with the lower receptacle 100.

As described above, the backlight assembly 20 can hold the gap between the light sources 320 and the light guide panel 400 through the gap holding portion 240 of the support frame 200 that accommodates and supports the light source module 300, and thus can minimize expansion of the light guide panel 400 due to heat generated from the light sources 320. Accordingly, the backlight assembly 20 can prevent the light sources 320 from being damaged by the expanded light guide panel 400 or being separated from the printed circuit board 310.

Further, the backlight assembly 20 can make the light sources 320 come in contact with the side wall portion 220 of the support frame 200 through forming of the insertion groove 221 on the side wall portion 220 so that the projection portion can be inserted into the side wall portion 220 of the support frame 200 around the light sources 320 on the printed circuit board 310. Accordingly, the backlight assembly 20 can make heat generated from the light sources 320 be discharged to the support frame 200 without leakage, and thus can improve the heat dissipation performance of the light sources 320 to reduce the deterioration of the light sources 320.

Next, a display device according to another embodiment will be described.

Figure 7:
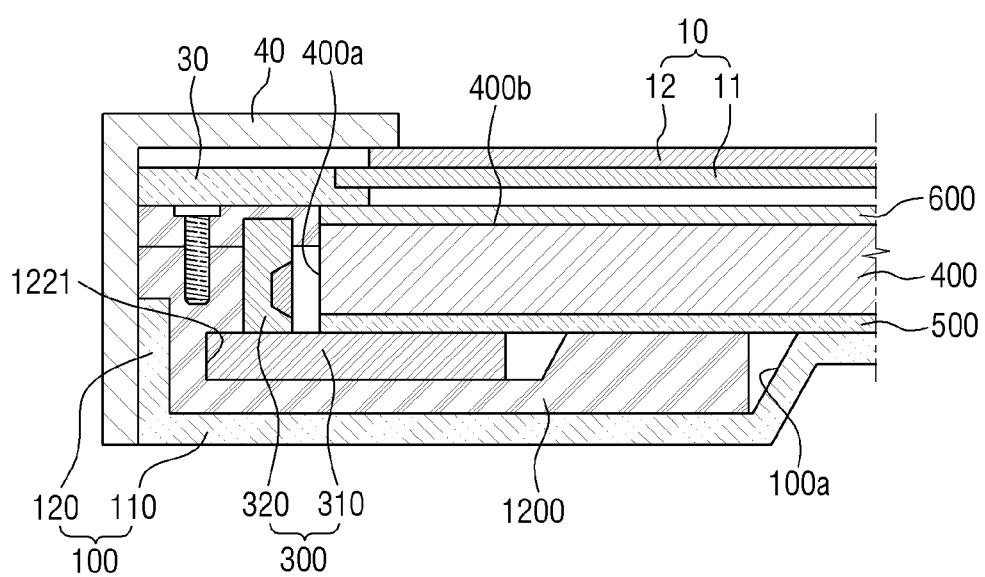
FIG. 7 is a cross-sectional view illustrating a portion that corresponds to line A-A' of FIG. 1 of a display device according to another embodiment.
Figure 8:
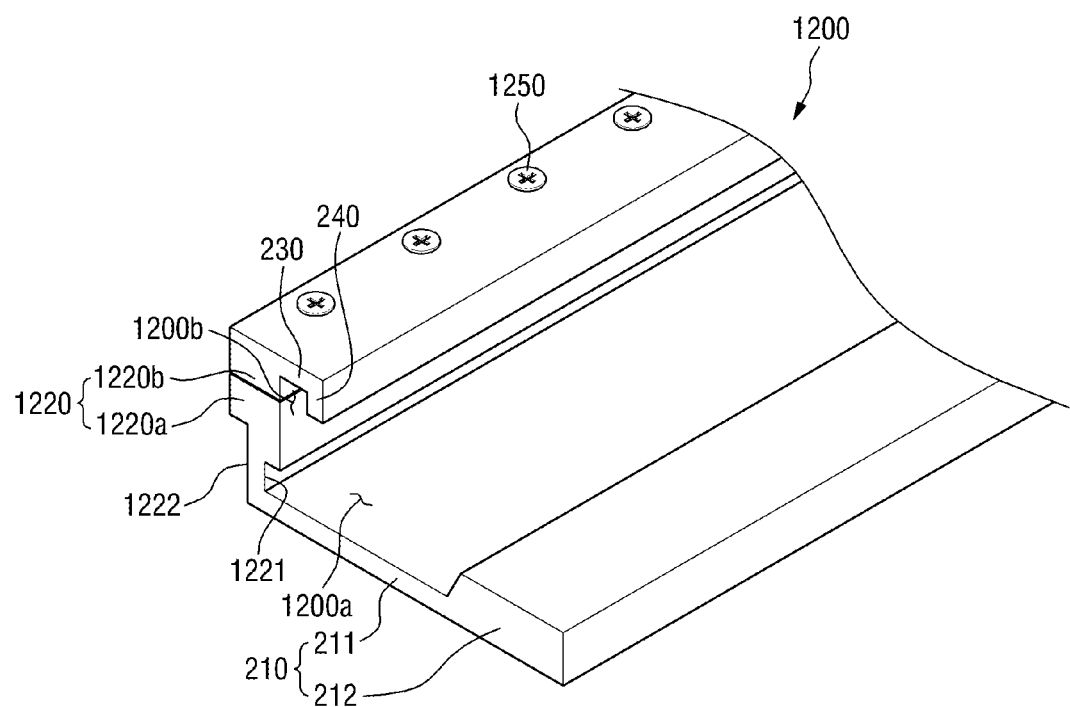
FIG. 8 is a perspective view illustrating the detailed structure of a support frame of FIG. 7.

FIG. 7 is a cross-sectional view illustrating a portion that corresponds to line A-A' of FIG. 1 of a display device according to another embodiment, and FIG. 8 is a perspective view illustrating the detailed structure of a support frame of FIG. 7.

Referring to FIGS. 7 and 8, the display device according to another embodiment includes a support frame 1200 that is different from the support frame 200 of the display device 50 of FIG. 1 in comparison to the display device 50 of FIG. 1. Accordingly, in explaining the display device according to another embodiment, only the support frame 1200 will be described in detail.

The support frame 1200 has a divided structure unlike the support frame 200 of FIG. 1 that is integrally formed. That is, the support frame 1200 includes a bottom portion 210, a divided side wall portion 1220, a cover portion 230, and a gap holding portion 240. Further, the support frame 1200 may further include a combining member 1250.

The divided side wall portion 1220 has a structure in which the side wall portion 220 that is integrally formed as shown in FIG. 3 is divided, and includes a first side wall portion 1220a connected to a base portion 211 of the bottom portion 210 and a second side wall portion 1220b connected to a cover portion 230 of the first side wall portion 1220a. An insertion groove 1221 is formed on the first side wall portion 1220a so that a part of a printed circuit board 310 is inserted into the insertion groove 1221. Further, on the outside of the first side wall portion 1220a, a combining groove 1222, into which a lower receptacle 100 is inserted, may be formed. A first accommodation space 1200a may be formed by the bottom portion 210 and the first side wall portion 1220a, and a second accommodation space 1200b may be formed by the second side wall portion 1220b, the cover portion 230, and the gap holding portion 240.

The combining member 1250 serves to combine the first side wall portion 1220a and the second side wall portion 1220b with each other, and may be, for example, a screw.

The assembling of the support frame 1200 that includes the divided side wall portion 1220 and a light source module 300 may be performed by arranging the light source module 300 in the first accommodation space 1200a that is formed by the first side wall portion 1220a and the bottom portion 210, arranging the second side wall portion 1220b in the first side wall portion 1220a, and then combining the second side wall portion 1220b and the first side wall portion 1220a with each other through the combining member 1250. This assembling method may facilitate the assembling of the support frame 1200 and the light source module 300 in comparison to the sliding method.

Next, a display device according to still another embodiment will be described.

Figure 9:
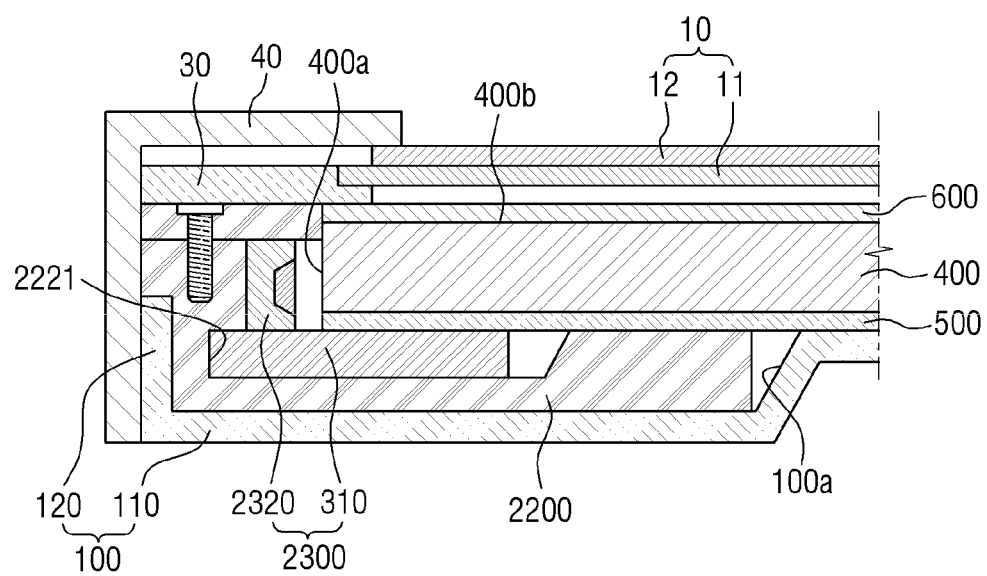
FIG. 9 is a cross-sectional view illustrating a portion that corresponds to line A-A' of FIG. 1 of a display device according to still another embodiment.
Figure 10:
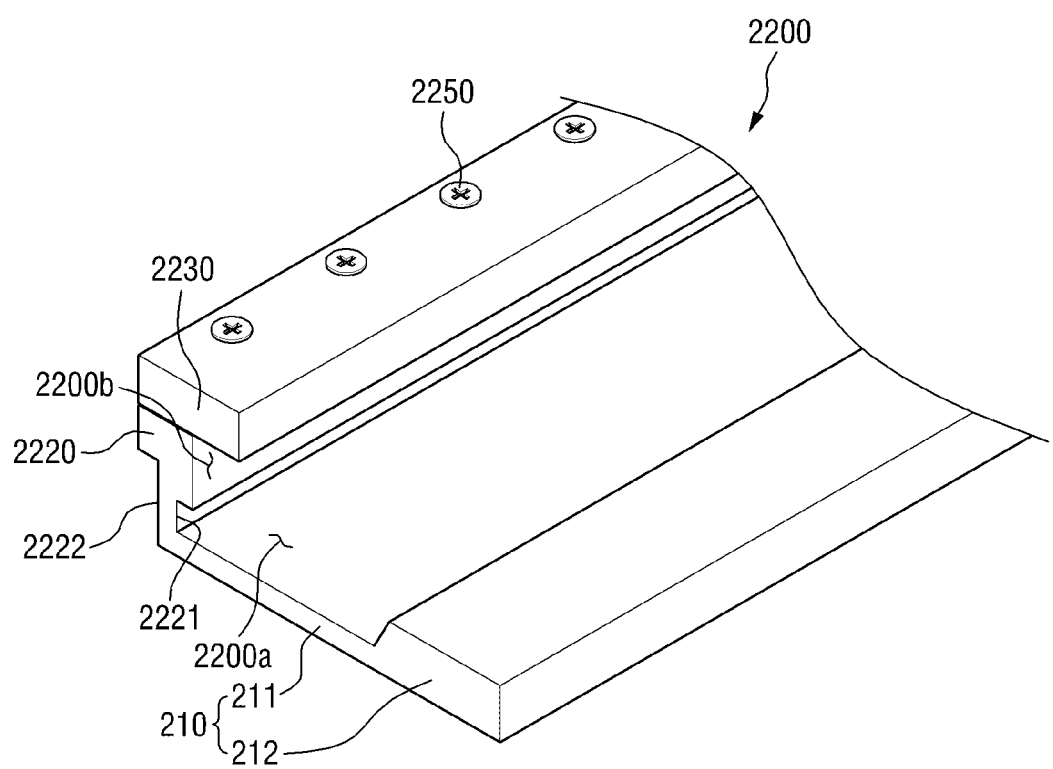
FIG. 10 is a perspective view illustrating the detailed structure of a support frame of FIG. 9.

FIG. 9 is a cross-sectional view illustrating a portion that corresponds to line A-A' of FIG. 1 of a display device according to still another embodiment. FIG. 10 is a perspective view illustrating the detailed structure of a support frame of FIG. 9, and FIG. 11 is a cross-sectional view illustrating the detailed structure of a light source module of FIG. 9.

Figure 11:
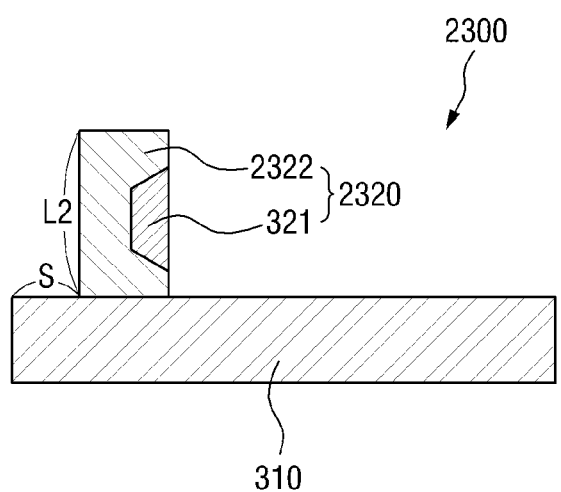
FIG. 11 is a cross-sectional view illustrating the detailed structure of a light source module of FIG. 9.

Referring to FIGS. 9 to 11, the display device according to still another embodiment includes a support frame 2200 and a light source module 2300 that are respectively different from the support frame 200 and the light source module 300 of the display device 50 of FIG. 1 in comparison to the display device 50 of FIG. 1. Accordingly, in explaining the display device according to still another embodiment, only the support frame 2200 and the light source module 2300 will be described in detail.

The support frame 2200 has a divided structure unlike the support frame 200 of FIG. 1 that is integrally formed, and the gap holding portion 240 of the support frame 200 of FIG. 1 is omitted. That is, the support frame 2200 includes a bottom portion 210, a divided side wall portion 2220, and a cover portion 2230. Further, the support frame 2200 may further include a combining member 2250.

The divided side wall portion 2220 and the cover portion 2230 has a structure in which the side wall portion 220 and the cover portion 230, which are integrally formed as shown in FIG. 3, are divided.

The side wall portion 2220, sometimes called a divided side wall portion 2220, is similar to the side wall portion 220 of FIG. 3. However, the side wall portion 2220 has a length that is shorter than the length of the side wall portion 220 of FIG. 3. This is because the length L2 of a support portion 2322 that supports a light source element 321 to be described below becomes shorter than the length L1 of the support portion 322 that supports the light source element 321 of FIG. 4. An insertion groove 2221 is formed on the side wall portion 2220 so that a part of a printed circuit board 310 is inserted into the insertion groove 2221. Further, on the outside of the side wall portion 2220, a combining groove 2222, into which a lower receptacle 100 is inserted, may be formed. A first accommodation space 2200a may be formed by the bottom portion 210 and the side wall portion 2220.

The cover portion 2230 is similar to the cover portion 230 of FIG. 3. However, since the length of the side wall portion 2220 becomes short, the cover portion 2230 comes in contact with one side surface of a light guide panel 400, i.e., a light incident surface 400a. Accordingly, the cover portion 2230 may serve to hold the gap between light sources 2320 and the light guide panel 400. That is, the cover portion 2230 may serve as the gap holding portion 240 of the support frame 200 of FIG. 3. On the other hand, a second accommodation space 2200b, which is a space surrounded by the side wall portion 2220 and the cover portion 2230, may be formed. A plurality of light sources 2320 are arranged in the second accommodation space 2200b.

The light source module 2300 is similar to the light source module 300 of FIG. 3. However, the support portion 2322 included in the light sources 2320 of the light source module 2300 has a length L2 that is shorter than the length L1 of the support portion 322 included in the light source module 300 of FIG. 3. That is, an upper surface of the support portion 2322 may be lower than an upper surface of the light guide panel 400. Through this, the above-described cover portion 2230 may partially come in contact with the light incident surface 400a of the light guide panel 400.

The combining member 2250 serves to combine the side wall portion 2220 and the cover portion 2230 with each other, and may be, for example, a screw.

The assembling of the support frame 2200 that includes the divided side wall portion 2220 and the cover portion 2230 and the light source module 2300 may be performed by arranging the light source module 2300 in the first accommodation space 2200a that is formed by the side wall portion 2220 and the bottom portion 210, arranging the cover portion 2230 on the side wall portion 2220, and then combining the cover portion 2230 and the side wall portion 2220 with each other through the combining member 2250. This assembling method may facilitate the assembling of the support frame 2200 and the light source module 2300 in comparison to the sliding method.

Next, a display device according to still another embodiment will be described.

Figure 12:
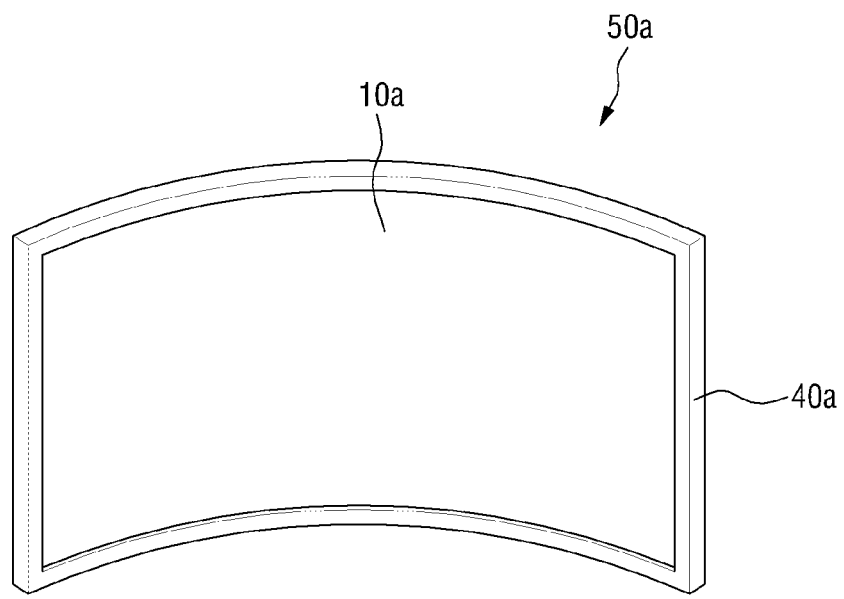
FIG. 12 is a schematic perspective view of a display device according to still another embodiment.
Figure 13:
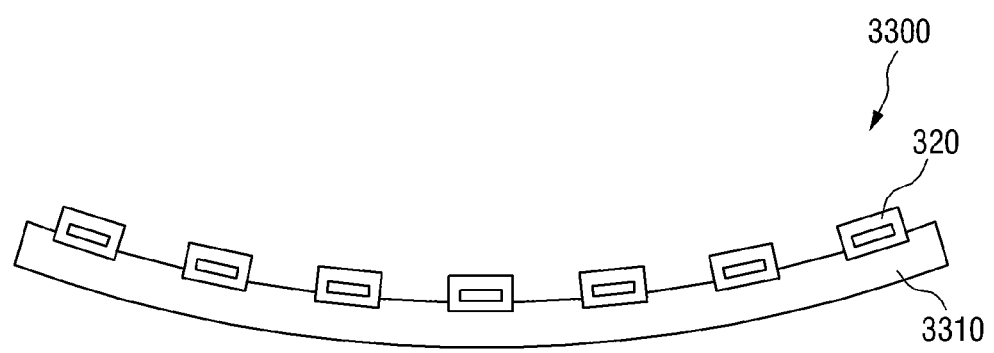
FIG. 13 is a perspective view of a light source module applied to the display device of FIG. 12.

FIG. 12 is a schematic perspective view of a display device according to still another embodiment, and FIG. 13 is a perspective view of a light source module applied to the display device of FIG. 12.

Referring to FIG. 12, a display device 50a according to still another embodiment is a curved display device having a curvature as a whole unlike the display device 50 of FIG. 1. In this case, a display panel 10a, a backlight assembly, a middle receptacle, and an upper receptacle 40a, which are constituent elements of the display device 50a, have the same arrangement as that of the display panel 10, the backlight assembly 20, the middle receptacle 30, and the upper receptacle 40, which are constituent elements of the display device 50 of FIG. 1, but are formed to follow the curvature as a whole.

For example, referring to FIG. 13, a light source module 3300 that is a constituent element of the backlight assembly may include a printed circuit board 3310 having a curvature, and a plurality of light sources 320 may be arranged on the printed circuit board 3310 having the curvature to be spaced apart from each other. In accordance with the light source module 3300, a support frame, in which the light source module 3300 is accommodated and supported, may have a curved shape.

The light source module 3300 may be arranged on the long side of the display device 50a, and thus the luminance of the display device 50a can be improved while the current consumption can be reduced.

Further, in the case where the printed circuit board 3310 is arranged on the bottom 110 (in FIG. 1) of the lower receptacle 100 (in FIG. 1), the printed circuit board to be applied to the curved display device can be manufactured at low cost and the plurality of light sources can be easily arranged on the printed circuit board in comparison to the case where the printed circuit board is arranged on the side wall of the lower receptacle.

Figure 14:
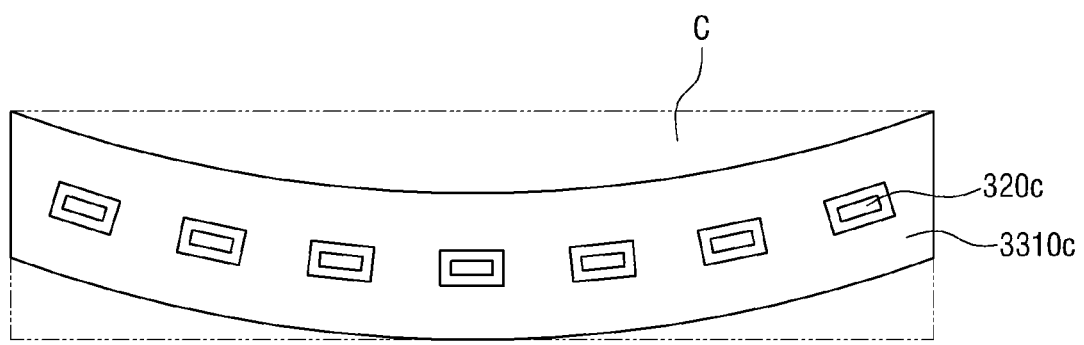
FIG. 14 is a perspective view of another light source module applied to the display device of FIG. 12.

Referring to FIG. 14, in order to apply a printed circuit board 3310c, which is arranged on the side wall of the lower receptacle, to a curved display device, it is necessary to form the printed circuit board 3310c so that the long side of the printed circuit board 3310c has a curvature, and thus it can be known that a large amount of material C is wasted when the printed circuit board 3310c is formed. Further, it can be known that it is difficult to arrange a plurality of light sources 320c along the curvature of the printed circuit board 3310c.

In concluding the detailed description, those skilled in the art will appreciate that many variations and modifications can be made to the preferred embodiments without substantially departing from the principles of the inventive concept. Therefore, the disclosed embodiments are used in a generic and descriptive sense only and not for purposes of limitation.

What is claimed is:

1. A backlight assembly comprising:
   a receptacle;
   a support frame arranged on one side of the receptacle; and
   a light source module accommodated in the support frame and including a printed circuit board and a plurality of light sources projecting from one surface of the printed circuit board,
   wherein the support frame includes a bottom portion, a side wall portion extending from the bottom portion to an upper side, a cover portion extending from the side wall portion to an inside, a gap holding portion extending from an end portion of the cover portion in a direction of the bottom portion, and an insertion groove outwardly indented from an inner side wall of the side wall portion to an outside on a boundary between the bottom portion and the side wall portion and having a bottom surface extending from an upper surface of the bottom portion, the insertion groove being formed in a portion of the side wall portion that is integral with the bottom portion,
   the printed circuit board is partially inserted into the insertion groove to be arranged on the upper surface of the bottom portion, and
   the plurality of fight sources are arranged in a space that is surrounded by the side wall portion, the cover portion, and the gap holding portion, wherein the light sources directly contact the portion of the side wall portion that is integral with the bottom portion, and
   wherein an upper surface of the bottom portion contacts an entire lower surface of the printed circuit board.

2. The backlight assembly of claim 1, wherein the plurality of light sources have directivity in a side direction.

3. The backlight assembly of claim 1, further comprising a light guide panel arranged on the receptacle and having a side surface facing the plurality of light sources in a state where the gap holding portion is interposed between the side surface and the plurality of light sources.

4. The backlight assembly of claim 3, wherein one side of the light guide panel overlaps the bottom portion and the printed circuit board.

5. The backlight assembly of claim 3, wherein each of the plurality of light sources comprises a light source element and a support portion in which the light source element is buried, and
   a part of the support portion overlaps the gap holding portion.

6. The backlight assembly of claim 5, wherein the support frame is integrally formed.

7. The backlight assembly of claim 5, wherein the side wall portion comprises a first side wall portion connected to the bottom portion and a second side wall portion separated from the first side wall portion and connected to the cover portion, and
   the first side wall portion and the second side wall portion are combined with each other by a fastening member.

8. The backlight assembly of claim 1, wherein the receptacle comprises a bottom and a side wall,
   the bottom portion includes a base portion that is closed to the side wall and has a first thickness, and an extension portion that extends from the base portion to an inside of the receptacle and has a second thickness that is thicker than the first thickness, and
   the printed circuit board is arranged on an upper surface of the base portion.

9. The backlight assembly of claim 1, wherein the support frame is formed of a metal material.

10. The backlight assembly of claim 1, wherein the receptacle, the support frame, and the printed circuit board have a curvature so as to be applied to a curved display.

11. A backlight assembly comprising:
    a receptacle;
    a support frame arranged on one side of the receptacle; and
    a light source module accommodated in the support frame and including a printed circuit board and a plurality of light sources projecting from one surface of the printed circuit board,
    wherein the support frame includes a bottom portion, a side wall portion extending from the bottom portion to an upper side, a cover portion extending from the side wall portion to an inside, and an insertion groove outwardly indented from an inner side wall of the side wall portion to an outside on a boundary between the bottom portion and the side wall portion and having a bottom surface extending from an upper surface of the bottom portion, the insertion groove being formed in a portion of the side wall portion that is integral with the bottom portion,
    the printed circuit board is partially inserted into the insertion groove to be arranged on the upper surface of the bottom portion, and the plurality of light sources are arranged in a space that is surrounded by the side wall portion and the cover portion, wherein the light sources directly contact the portion of the side wall portion that is integral with the bottom portion, and wherein an upper surface of the bottom portion contacts an entire lower surface of the printed circuit board.

12. The backlight assembly of claim 11, wherein the plurality of light sources have directivity in a side direction.

13. The backlight assembly of claim 11, further comprising a light guide panel arranged on the receptacle and having a side surface facing the plurality of light sources in a state where the side surface is spaced apart from the plurality of light sources and to form a gap between the plurality of light sources.

14. The backlight assembly of claim 13, wherein the cover portion extends from an upper portion of the side wall portion to conic in contact with the side surface of the light guide panel.

15. The backlight assembly of claim 13, wherein one side of the light guide panel overlaps the bottom portion and the printed circuit board.

16. The backlight assembly of claim 13, wherein each of the plurality of light sources comprises a light source element and a support portion in which the light source element is buried, and an upper surface of the support portion is positioned to be lower than an upper surface of the light guide panel.

17. The backlight assembly of claim 16, wherein the side wall portion and the cover portion are separated from each other, and are combined with each other by a fastening member.

18. The backlight assembly of claim 11, wherein the receptacle comprises a bottom and a side wall, the bottom portion includes a base portion that is closed to the side wall and has a first thickness, and an extension portion that extends from the base portion to an inside of the receptacle and has a second thickness that is thicker than the first thickness, and the printed circuit board is arranged on an upper surface of the base portion.

19. The back-light assembly of claim 11, wherein the support frame is formed of a metal material.

20. The backlight assembly of claim 11, wherein the receptacle, the support frame, and the printed circuit board have a curvature so as to be applied to a curved display.

* * * * *